United States Patent [19]
Khovaylo et al.

[11] Patent Number: 5,646,402
[45] Date of Patent: Jul. 8, 1997

[54] EXPANDABLE HAND-HELD SCANNING DEVICE

[75] Inventors: Modest Khovaylo, Fort Collins; Frank P. Carau, Sr., Loveland, both of Colo.

[73] Assignee: Hewlett-Packard Company, Palo Alto, Calif.

[21] Appl. No.: 523,700

[22] Filed: Sep. 5, 1995

[51] Int. Cl.$^6$ .................................................. G06K 9/22
[52] U.S. Cl. ........................ 250/234; 250/208.1; 235/472
[58] Field of Search ............................. 250/234, 208.1, 250/208.2, 208.3; 235/472; 348/374, 376; 358/473

[56] References Cited

U.S. PATENT DOCUMENTS

| | | |
|---|---|---|
| 4,870,268 | 9/1989 | Vincent et al. . |
| 4,926,041 | 5/1990 | Boyd . |
| 5,019,703 | 5/1991 | Boyd et al. . |
| 5,032,004 | 7/1991 | Steinle . |
| 5,040,872 | 8/1991 | Steinle . |
| 5,044,727 | 9/1991 | Steinle . |
| 5,227,620 | 7/1993 | Elder, Jr. et al. . |
| 5,306,908 | 4/1994 | McConica et al. . |
| 5,381,020 | 1/1995 | Kochis et al. . |
| 5,410,347 | 4/1995 | Steinle et al. . |
| 5,431,389 | 7/1995 | Wensink et al. ..................... 358/473 |
| 5,530,619 | 6/1996 | Koenck et al. ..................... 235/472 |
| 5,552,597 | 9/1996 | McConica ..................... 250/234 |

*Primary Examiner*—Edward P. Westin
*Assistant Examiner*—Kevin Pyo

[57] ABSTRACT

The hand-held scanning device is adjustable between a compact transport configuration and a relatively larger use configuration. In its compact transport configuration, the hand-held scanning device can conveniently be carried, for example, in a shirt pocket. In its use configuration, however, the device is capable of scanning a relatively large object. The hand-held scanning device may be constructed of two housing portions that slide or pivot relatively to one another to provide for this adjustment.

8 Claims, 5 Drawing Sheets

EXPANDABLE HAND-HELD SCANNING DEVICE

FIELD OF THE INVENTION

The present invention relates generally to optical scanners and, more particularly, to a hand-held optical scanner that is adjustable between a relatively compact carrying configuration and an expanded scanning configuration.

BACKGROUND OF THE INVENTION

Optical scanners are well-known in the art and produce machine-readable data which is representative of the image of an object, e.g. a page of printed text. Optical scanners generally employ line-focus systems which image an object by sequentially focusing narrow "scan line" portions of the object onto a linear photosensor array by sweeping a scanning head over the object.

In a line-focus system, a light beam from an illuminated line object is imaged by a lens on a linear photosensor array which is positioned remotely from the line object. The linear photosensor array is a single dimension array of photoelements which correspond to small area locations on the line object. These small area locations on the line object are commonly referred to as "picture elements" or "pixels." In response to light from its corresponding pixel location on the line object, each photosensor pixel element in the linear photosensor array (sometimes referred to simply as "pixels") produces a data signal which is representative of the light intensity that it experiences during an immediately preceding interval of time known as a sampling interval. All of the photoelement data signals are received and processed by an appropriate data processing system.

In a color optical scanner, a plurality of spectrally separated imaging beams (typically red, green and blue beams) must be projected onto photosensor arrays. Some color optical scanners employ beam splitter devices for spectrally separating an imaging light beam into color component beams. These separate color component beams are projected onto separate linear photosensor arrays. Other optical scanners project color component images on a single linear array in a series of separate scanning passes.

The construction and operation of color optical scanners employing beam splitter assemblies and photosensor arrays are fully disclosed in the following United States patents: U.S. Pat. Nos. 4,870,268 of Vincent et al. for COLOR COMBINER AND SEPARATOR AND IMPLEMENTATIONS; 4,926,041 of Boyd for OPTICAL SCANNER (and corresponding EPO patent application no. 90306876.5 filed Jun. 22, 1990); 5,019,703 of Boyd et al. for OPTICAL SCANNER WITH MIRROR MOUNTED OCCLUDING APERTURE OR FILTER (and corresponding EPO patent application no. 90312893.2 filed Nov. 27, 1990); 5,032,004 of Steinle for BEAM SPLITTER APPARATUS WITH ADJUSTABLE IMAGE FOCUS AND REGISTRATION (and corresponding EPO patent application no. 91304185.1 filed May 9, 1991); 5,044,727 of Steinle for BEAM SPLITTER/COMBINER APPARATUS (and corresponding EPO patent application no. 91303860.3 filed Apr. 29, 1991); 5,040,872 of Steinle for BEAM SPLITTER/COMBINER WITH PATH LENGTH COMPENSATOR (and corresponding EPO patent application no. 90124279.2 filed Dec. 14, 1990 which has been abandoned); and 5,227,620 of Elder, Jr. et al. for APPARATUS FOR ASSEMBLING COMPONENTS OF COLOR OPTICAL SCANNERS (and corresponding EPO patent application no. 91304403.8 filed May 16, 1991), 5,410,347 of Steinle et al. for COLOR OPTICAL SCANNER WITH IMAGE REGISTRATION HOLDING ASSEMBLY which are all hereby specifically incorporated by reference for all that is disclosed therein.

A hand-held optical scanning device is an optical scanner which is moved across a scanned object, e.g. a page of text, by hand. Rollers may be provided on a hand-held scanning device to guide the device across the object to be scanned and also to provide data to the scanning device microprocessor regarding the speed at which the scanning device is being moved over the scanned object. These rollers may also serve to control the speed at which an operator moves the scanning device across the scanned object.

The construction and operation of hand-held optical scanning devices employing such rollers is fully disclosed in U.S. Pat. Nos. 5,306,908 of McConica et al. for MANUALLY OPERATED HAND-HELD OPTICAL SCANNER WITH TACTILE SPEED CONTROL ASSEMBLY (and corresponding EPO patent application no. 94301507.3 filed Mar. 2, 1994); and 5,381,020 of Kochis et al. for HAND-HELD OPTICAL SCANNER WITH ONBOARD BATTERY RECHARGING ASSEMBLY, which are all hereby specifically incorporated by reference for all that is disclosed therein.

Optical systems for hand-held scanning devices must generally be very compact due to the relatively small size of hand-held scanning devices. The construction and operation of such an optical system for a hand-held optical scanning device is fully disclosed in U.S. Pat. No. 5,552,597 of McConica for LIGHT PATH FOR HAND-HELD SCANNER, which is hereby specifically incorporated by reference for all that is disclosed therein.

The size of a hand-held scanning device generally corresponds to the size of the objects to be scanned. For example, if 8.5 inch by 11 inch documents are to be scanned, then the length of the scanning device must generally be greater than 8.5 inches. It has been found, however, that a scanning device of this size is unwieldy to transport. A hand-held scanning device having such a minimum dimension could not, for example, conveniently be carried in a user's pocket.

To avoid this problem and achieve a greater degree of compactness, some hand-held scanning devices are constructed smaller than the size of the objects to be scanned. In order to scan the entire object, the user is required to "sweep" such a scanning device over all parts of the object. Circuitry within the scanning device then assembles or "stitches" the image portions together in order to obtain a complete image of the scanned object.

Although relatively compact, this type of hand-held scanning device has its drawbacks. The stitching function required in this type of device, for example, is relatively complex and generally results in severely reduced image quality. Also, the required multiple pass sweeping operation is relatively slow compared to that provided by a full-width single pass scanning device. In addition, many users find the multiple pass scanning to be generally inconvenient.

SUMMARY OF THE INVENTION

The present invention is directed to a hand-held scanning device which is compact and yet which enables full-width, one-pass scanning of objects.

To enable full width scanning in a compact configuration, the scanning device of the present invention is provided with two sensor assemblies which are located in two different portions of the scanning device. Each sensor assembly contains at least one photosensor array and associated optical components to transmit a line image of a scanned object to the photosensor array. When not being used, the portions of the scanning device containing the two sensor assemblies may be arranged adjacent one another in order to minimize the length of the scanning device. When it is desired to scan an object, however, the portions of the scanning device containing the two sensor assemblies may be moved into a relatively expanded configuration in order to maximize the length of the scanning device. The portions of the scanning device containing the two sensor assemblies may be slidingly or pivotally attached to one another in order to allow for the movement described above.

DETAILED DESCRIPTION OF THE INVENTION

Figure 1:
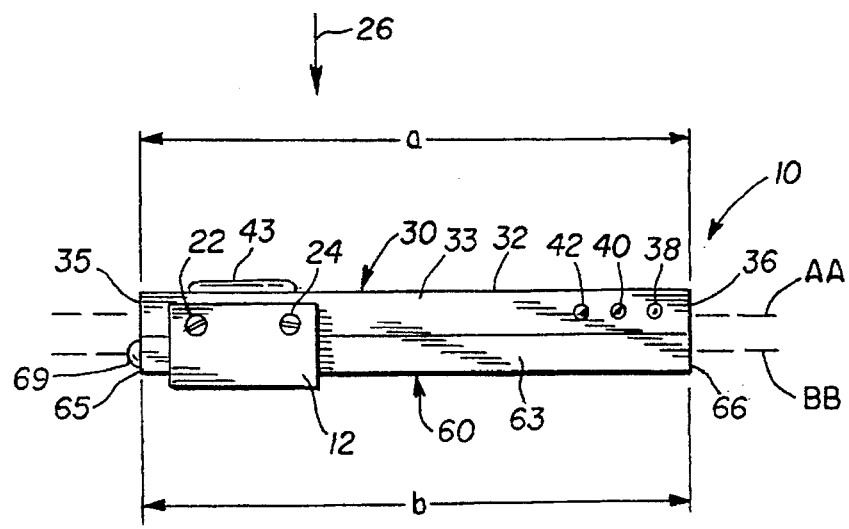
FIG. 1 is a top plan view of an expandable hand-held scanning device in a closed configuration.

FIGS. 1–15, in general, illustrate a hand-held optical scanning device 10 having a first housing portion 30 which contains at least one photosensor array 58 and an imaging device 56 which images an object on the photosensor array 58. The hand-held optical scanning device 10 also has a second housing portion 60 which contains at least one photosensor array 88 and an imaging device 86 which images an object on the photosensor array 88. A connecting mechanism 12, 212 allows relative movement to occur between the first housing portion 30 and the second housing portion 60 in order to allow the scanning device 10 to be expanded from a relatively smaller carrying configuration, FIGS. 1, 2 and 13, to a relatively larger scanning configuration, FIGS. 3, 4 and 12.

Having thus described the hand-held scanning device in general, the device will now be described in further detail.

FIG. 1 illustrates an expandable hand-held scanning device 10 in its closed configuration. The scanning device 10 includes a first housing portion 30, having a first central longitudinal axis AA, and a second housing portion 60, having a second central longitudinal axis BB, which are connected so as to allow relative sliding movement therebetween as will be described in further detail below.

Figure 3:
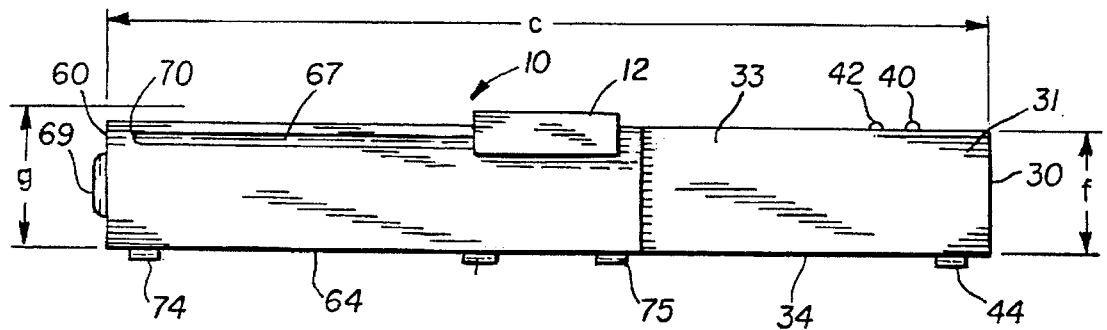
FIG. 3 is a rear elevation view of the hand-held scanning device of FIG. 1 in an expanded configuration.
Figure 4:
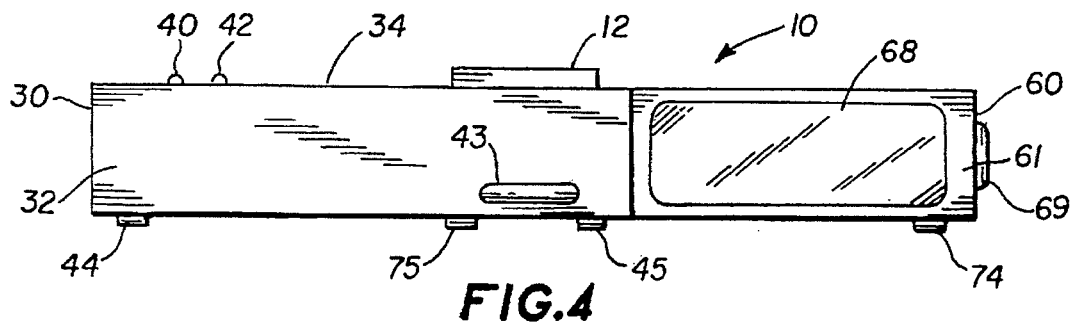
FIG. 4 is a front elevation view of the hand-held scanning device of FIG. 1 in an expanded configuration.
Figure 5:
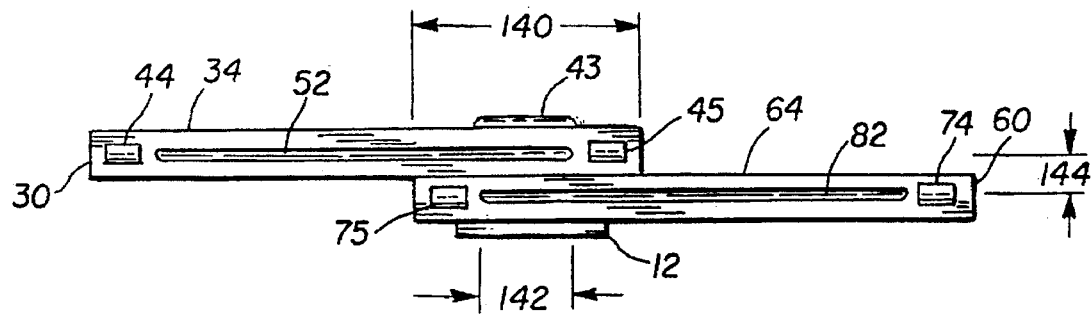
FIG. 5 is a bottom plan view of the hand-held scanning device of FIG. 1 in an expanded configuration.

Housing portion 30 may be a generally parallelepiped-shaped member having a generally flat front surface 31, FIG. 3; a generally flat rear surface 32, FIG. 4; a generally flat top surface 33, FIG. 1; a generally flat bottom surface 34, FIG. 5; and generally flat opposite end surfaces 35, 36, FIG. 1. It is to be understood that the designations top, bottom, front, etc. as used herein are arbitrary and are simply used for descriptive purposes.

Figure 2:
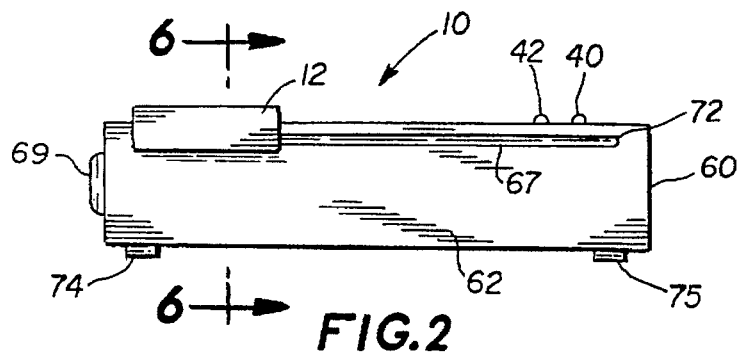
FIG. 2 is a rear elevation view of the hand-held scanning device of FIG. 1 in a closed configuration.

Housing portion 60 may be a generally parallelepiped-shaped member having a generally flat front surface 61, FIG. 4; a generally flat rear surface 62, FIG. 2; a generally flat top surface 63, FIG. 1; a generally flat bottom surface 64, FIG. 5; and generally flat opposite end surfaces 65, 66, FIG. 1.

Figure 6:
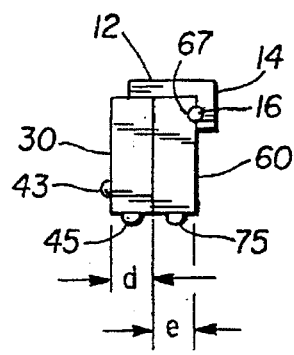
FIG. 6 is a cross section view taken on the line 6—6 of FIG. 2.
Figure 7:
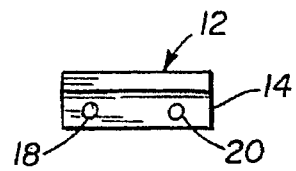
FIG. 7 is a front elevation detail view of a bracket used in the hand-held scanning device of FIG. 1.

A bracket 12 may be attached to the first housing portion 30 by means of screws 22 and 24. Bracket 12 is illustrated in further detail, removed from housing portion 30, in FIG. 7. FIG. 7 shows bracket 12 as viewed from front, i.e. the direction of arrow 26 in FIG. 1. As can be seen from FIG. 7, bracket 12 has a lower leg 14 which contains two indentations 18 and 20. These indentations each receive a ball bearing 16 as shown in FIG. 6 (only one ball bearing is shown). The ball bearings fit within the corresponding groove 67 of the housing portion 60 as shown in FIG. 6.

As can best be seen in FIGS. 2 and 3, attachment in this manner allows the ball bearings to roll along the groove 67 thus allowing first housing portion 30 to slide relatively to second housing portion 60. In this manner, the hand-held scanning device 1 can be extended from the closed configuration shown in FIGS. 1 and 2 to the open configuration shown in FIGS. 3 and 4. The end 70, FIG. 3, of groove 67 engages with the ball bearing in indentation 20 to provide a stop when sliding the scanning device into its closed configuration as shown in FIGS. 1 and 2. In a similar manner, the end 72 of groove 67 engages with the ball bearing in indentation 18 to provide a stop when sliding the scanning device into its open configuration shown in FIGS. 3 and 4.

As an alternative to the screws 22 and 24, the bracket 12 may be attached to housing portion 30 in any suitable manner. Examples of other attachment methods include welding, brazing, soldering or riveting. Also, any number of ball bearings such as ball bearing 16 may be provided for engagement in the groove 67, if desired.

Although a specific slide mechanism has been described above to allow relative movement between the first housing portion 30 and the second housing portion 60, it should be appreciated that any suitable mechanism that allows such sliding movement to occur could alternatively be used.

To allow the hand-held scanning device 10 to be moved across an object that is to be scanned, rollers may be provided on the bottom surface 34 of first housing portion 30 and the bottom surface 64 of second housing portion 60. First housing portion outer roller 44 and inner roller 45 are located on the bottom surface 34 of first housing portion 30. Second housing portion outer roller 74 and inner roller 75 are located on the bottom surface 64 of second housing portion 60. These rollers are configured to allow rolling movement of the hand-held scanning device in a direction perpendicular to the previously-described direction of sliding movement between the housing portion 30 and the housing portion 60, i.e., in the direction of arrow 26, FIG. 1.

First housing portion 30 also contains a sensor window 52 for receiving line scan images of a scanned object, FIG. 5. Sensor window 52 is optically connected to an imaging assembly 56 as shown schematically in FIG. 10. Imaging assembly 56 may contain a mirror or mirrors, a lens and/or other optical components in order to focus a line image of the scanned object transmitted through sensor window 52 onto a photosensor array 58 in a manner that is well-known. Imaging assembly 56 and photosensor array 58 may, for example, be constructed in a manner as generally shown by U.S. patent application Ser. No. 08/271,333 as previously referenced. Sensor window 52 may additionally contain a light source as is also well-known. A data signal 98, representative of scanned line images, is transmitted by photosensor array 58 to a microprocessor 110 which may be located in first housing portion 30.

Second housing portion 60 contains a sensor window 82 for receiving line scan images of a scanned object, FIG. 5. Sensor window 82 is optically connected to an imaging assembly 86 as shown schematically in FIG. 10. Imaging assembly 86 may contain a mirror or mirrors, a lens and/or other optical components in order to focus a line image of the scanned object transmitted through sensor window 82 onto a photosensor array 88 in a manner that is well-known. Imaging assembly 86 and photosensor array 88 may be constructed in an identical fashion to the imaging assembly 56 and photosensor array 58 previously described with respect to housing portion 30. Sensor window 82 may additionally contain a light source as is also well-known. A data signal 100, representative of scanned line images, is transmitted by photosensor array 88 to the microprocessor 110.

Referring again to FIG. 10, first housing portion outer roller 44 may be connected to a transducer 92 located in the first housing portion 30. Transducer 92 sends a signal 102 to microprocessor 110 which is indicative of the speed and displacement of the roller 44. In a similar manner, second housing portion outer roller 74 is connected to a transducer 90 located in the second housing portion 60. Transducer 90 sends a signal 104 to microprocessor 110 which is indicative of the speed and displacement of roller 74. In this manner, the microprocessor can determine the displacement of the hand-held scanning device 10 during a scanning operation in order to correlate data signals 98 and 100 from the photosensor arrays 58 and 88 to the proper location on the scanned object. The microprocessor 110 can also detect and adjust for skew in the scanning operation by monitoring the relative speed of the rollers 44 and 74.

Figure 10:
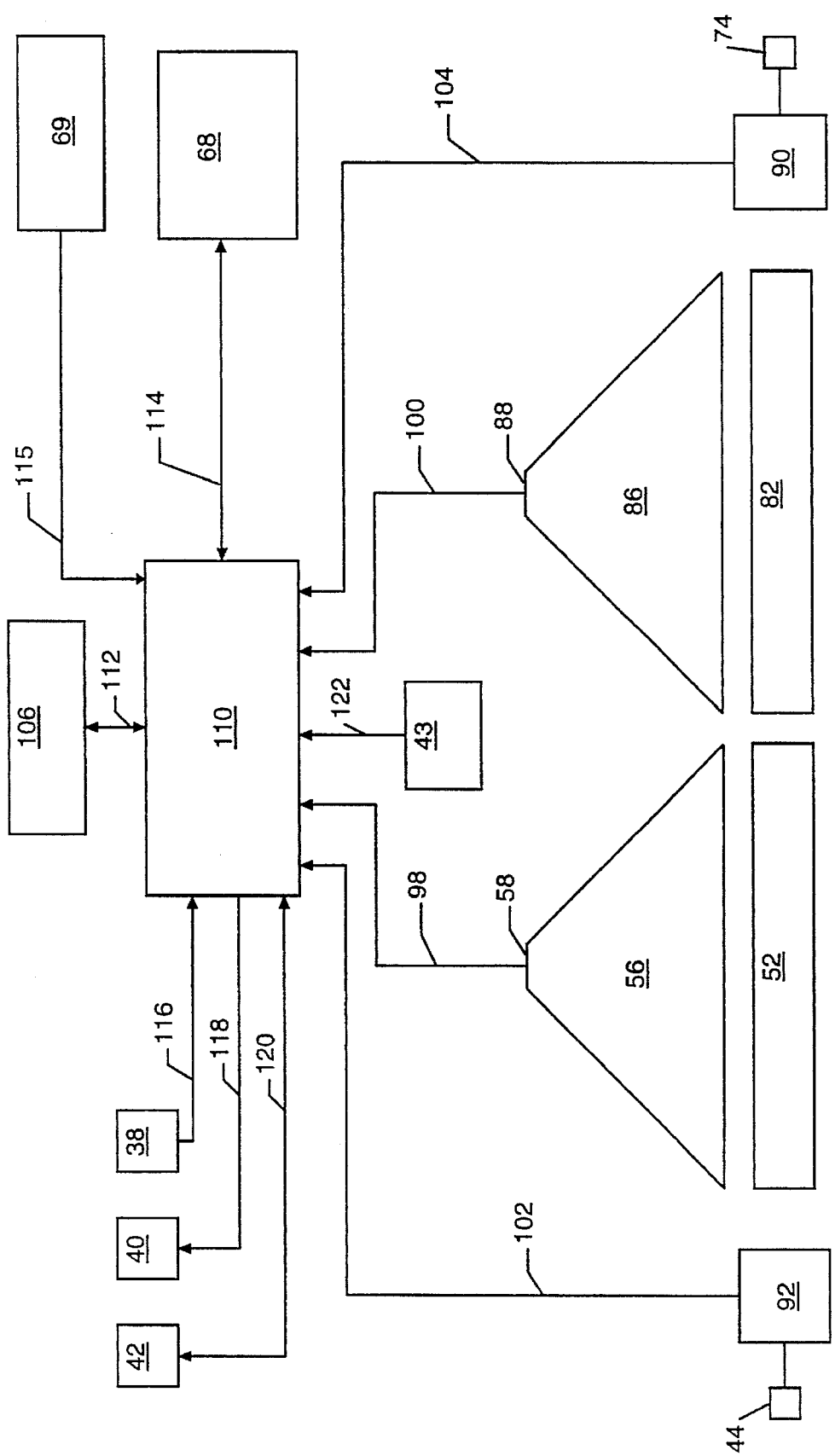
FIG. 10 is a schematic illustration showing the relationship between various functional components of the hand-held scanning device of FIG. 1.

First housing portion 30 contains a memory storage device 106, FIG. 10. The memory storage device 106 is connected to microprocessor 110 by connection 112. This memory storage device 106 serves to store images of scanned objects acquired by the hand-held scanning device 10. Memory storage device 106 may be an eight mega-byte flash ram device, capable of storing data equivalent to approximately fifty 8.5 inch by 11 inch pages of text. Memory storage device 106 may, alternatively be constructed as an integral part of microprocessor 110, rather than as a separate unit.

A scan button 43 is located on the rear surface 32 of first housing portion 30, FIG. 4. Scan button 43 is connected to microprocessor 110 as illustrated by reference numeral 122 in FIG. 10. Scan button 43 is configured so as to be operable by a user when performing a scanning operation. Depressing scan button 43 causes microprocessor 110 to carry out a scanning operation.

Input/output port 38, power light 40 and user interface button 42 are all located on the upper surface 33 of first housing portion 30 as best shown in FIG. 1. The structure and operation of these features is described in further detail below.

Input/output port 38 is connected to microprocessor 110 as shown schematically by reference numeral 120 in FIG. 10. Input/output port 38 allows image data acquired by the hand-held scanning device 10 and/or stored by the microprocessor 110 and the memory storage device 106 to be transmitted or "downloaded" to a computer or other data-handling device. Input/output port 38 may be a physical connection device such as the industry standard 1284 high speed parallel interface bus or may be a non-contact connection apparatus such as an infrared communication port. Examples of such infrared communication ports are commercially available from Hewlett-Packard Company, sold as the "HSDL-1000 Infrared IRDA Compliant Transceiver" and the "HSDL-7000 Infrared Modulator/Demodulator Integrated Circuit".

Power light 40 may be connected to microprocessor 110 via connection 118, FIG. 10. When the hand-held scanning device 10 is powered on, power light 40 is illuminated, thus indicating the powered-on status to a user.

The user interface button 42 allows a user of the hand-held scanning device to communicate with the microprocessor 110 in order to accomplish such functions as selecting menu items, zooming in and out on scanned images, saving and deleting scanned images and printing scanned images. User interface button 42 is connected to microprocessor 110 as indicated by reference numeral 116, FIG. 10.

Second housing portion 60 may contain a screen 68 for displaying images of objects that are being scanned and also for displaying images of previously scanned objects that are stored by microprocessor 110 and/or memory device 106. Screen 68 is connected to microprocessor 110 by connection 112. Screen 68 may be configured so as to display the full width of the scanned image. Thus, by observing screen 68 during a scan, the user can ensure that the desired width of the scanned object is being captured. Screen 68 can also be used to display images that have been previously scanned and stored in microprocessor 110 and/or memory device 106. In this manner, the user of hand-held scanning device 10 can ensure that desired scan objects have been adequately captured before downloading the images to a computer or other data handling device.

Screen 68 may be also be used to display status information for the hand-held scanning device 10 generated by microprocessor 110. Additionally, screen 68 may be used to display menu information affording a user access to various scanning-related functions provided by the microprocessor 110. User interface button 42 may be used to select the menu items displayed on screen 68. Examples of such menu-selected functions include selecting a document, selecting a storage folder for a document, filing a document, deleting a document, printing a document and viewing a document.

Screen 68 may be a liquid crystal display (LCD) type screen of well known configuration. Such an LCD screen may be of the type commercially available from Samsung, sold as catalog number UG-641-01, customized to a size of approximately 3 inches by ¾ inch (111 by 27 pixels).

Second housing portion 60 may also contain a scroll button 69, FIGS. 1–4. Scroll button 69 allows a user of the hand-held scanning device to communicate with the microprocessor 110 in order to scroll up and down on a previously scanned image in order to examine an entire scanned page displayed on screen 68. Scroll button 69 may be connected to microprocessor 110 as indicated by reference numeral 115 in FIG. 10.

Because of the location of screen 68 on the front surface 61 of second housing portion 60, the screen 68 is protected when the hand-held scanning device 10 is in its closed configuration as shown in FIGS. 1 and 2. When closed, housing portion 30 completely covers and protects the screen 68.

Figure 8:
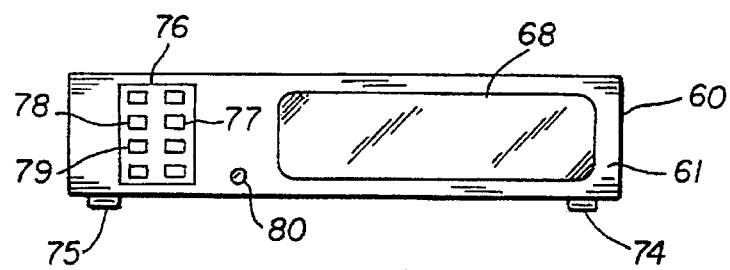
FIG. 8 is a front elevation view of a portion of the hand-held scanning device of FIG. 1.
Figure 9:
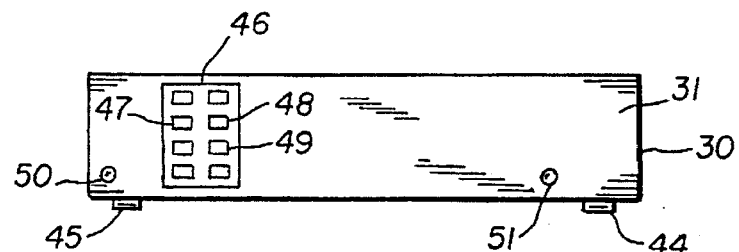
FIG. 9 is a front elevation view of another portion of the hand-held scanning device of FIG. 1.

In order to provide electrical connections between housing portion 30 and housing portion 60, a connection is provided as will now be described in detail. FIGS. 8 and 9 show housing portion 60 and housing portion 30, respectively, separated from one another. FIG. 8 shows the front surface 61 of housing portion 60 upon which is located a connector assembly 76. Connector assembly 76 contains conductive contact pads as illustrated, for example, by inner contact pad 77 and outer contact pads 78 and 79.

FIG. 9 shows the front surface 31 of housing portion 30 upon which is located a connector assembly 46. Connector assembly 46 contains conductive contact pads as illustrated, for example, by outer contact pad 47 and inner contact pads 48 and 49. The connector assembly 46 may be constructed in a manner identical to the connector assembly 76 of housing portion 60 described above.

When housing portion 30 and housing portion 60 are assembled, the first housing portion connector assembly 46 and the second housing portion connector assembly 76 face each other. When the hand-held scanning device is in its closed configuration, as shown in FIGS. 1 and 2, the connector assemblies 46 and 76 will be located at opposite ends of the hand-held scanning device. Referring, for example, to FIG. 2, connector assembly 46 is located at the left side of hand-held scanning device 10, while connector assembly 76 is located at the right side of hand-held scanning device 10.

When the hand-held scanning device 10 is opened to its use configuration, however, the connector assemblies 46 and 76 align with each other. See, for example, FIGS. 3 and 4. When so aligned, the contact pads of connector assembly 46 align with the contact pads of connector assembly 76. Outer contact pad 47 of connector assembly 46, for example, aligns with inner contact pad 77 of connector 76 and the inner contact pads 48 and 49 of connector assembly 46 align with the outer contact pads 78 and 79 of connector assembly 76, respectively. In a similar manner, all of the contact pads on the connector assembly 46 align with all of the contact pads on the connector assembly 76 when the hand-held scanning device is opened to its use configuration.

The contact pads of both the connector assembly 46 and the connector assembly 76 are biased outwardly from the first housing portion front surface 31 and second housing portion front surface 61, respectively in a manner that is well known. The connector pads may be of the type commercially available from Bourns, Inc. as "Model 70AD/M Sliding Battery Contacts". In this manner, the contact pads of connector assembly 46 are held tightly against the corresponding contact pads of connector assembly 76 when the hand-held scanning device is in its open, use configuration.

The connector assemblies 46 and 76, thus provide discreet electrical contacts between first housing portion 30 and second housing portion 60 when the hand-held scanning device is in its open use configuration. These electrical contacts are used, for example to carry the signal 100 between the microprocessor 110 located in housing portion 30 and the photosensor array 88 located in housing portion 60, the signal 104 between the microprocessor 110 located in housing portion 30 and the transducer 90 located in housing portion 60, the signal 114 between the microprocessor 110 located in housing portion 30 and the screen 68 located in the housing portion 60 and the signal 115 between the microprocessor 110 and scroll button 69.

Although a specific connection mechanism has been described above, it should be appreciated that any suitable mechanism that provides such connection could alternatively be used. Examples of such alternative connection mechanisms include cable connections and infrared link mechanisms.

In order to releasably hold the hand-held scanning device 10 in its open use configuration, a spring loaded ball 80 may be located in the front surface 61 of second housing portion 60, as shown in FIG. 8. Spring loaded ball 80 is biased outwardly from front surface 61, toward the front surface 31 of first housing portion 30 when the first housing portion 30 and second housing portion 60 are assembled with bracket 12 as previously described. A detent 50 is provided on the front surface 31 of first housing portion 30, as shown in FIG. 9. The location of the spring loaded ball 80 and the detent 50 are such that the ball 80 engages in the detent 50 when the hand-held scanning device 10 is in its fully open, use configuration.

In order to releasably hold the hand-held scanning device 10 in its closed configuration, a detent 51 is provided on the front surface 31 of first housing portion 30, as shown in FIG. 9. The location of the spring loaded ball 80 and the detent 51 are such that the ball 80 engages in the detent 50 when the hand-held scanning device 10 is in its fully closed configuration, as shown in FIGS. 1 and 2.

Figure 13:
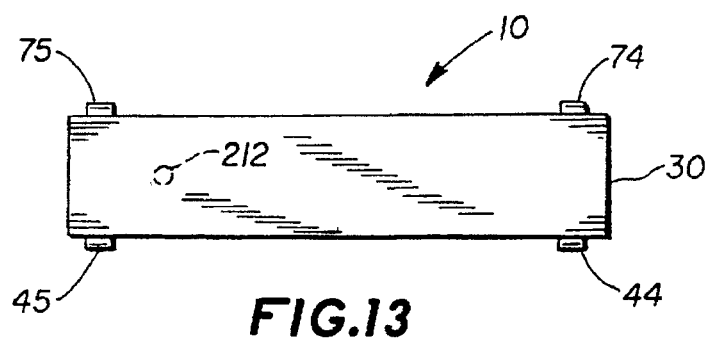
FIG. 13 is a rear elevation view of the hand-held scanning device of FIG. 12 in its closed configuration.

First housing portion 30 may have a length "a" of 5.5 inches, FIG. 1; a height "f" of 1.1 inches, FIG. 3; and a depth "d" of 0.25 inches, FIG. 6. Sensor window 52 may be 5.1 inches long and may be centered lengthwise in first housing portion 30. Second housing portion 60 may have a length "b" of 5.5 inches, FIG. 1; a height "g" of 1.25 inches, FIG. 3; and a depth "e" of 0.25 inches, FIG. 6. Sensor window 82 may be 5.1 inches long and may be centered lengthwise in second housing portion 60. Accordingly, in its closed configuration as shown in FIGS. 1, 2 and 13, the hand-held scanning device may have an overall length of 5.5 inches, making it easily transportable, for example in a shirt pocket.

When hand-held scanning device 10 is in its open configuration, first housing portion 30 and second housing portion 60 overlap as illustrated by reference numeral 140 in FIG. 5. This overlap may extend for about 1.9 inches. Accordingly, the sensor windows 52 and 82 may overlap, as illustrated by reference numeral 142, for a distance of about 1.5 inches as shown in FIG. 5. Some overlap of the sensor windows 52 and 82 is desirable to ensure capture of the entire width of the object being scanned.

In its extended configuration as shown in FIGS. 3–5, the hand-held scanning device 10 may have an overall length of 9.1 inches. The scanning length of the hand-held scanning device is the distance from the end of sensor window 52 to the end of sensor window 82 when the hand-held scanning device is in its extended configuration as shown in FIGS. 3–5. With the exemplary dimensions outlined above, the scanning length of the hand-held scanning device is about 8.7 inches. This scanning length is convenient in that it allows a standard 8½ inch wide document to be scanned in one pass. The scanning length is slightly larger than 8½ inches to accommodate for user error.

The sensor windows 52 and 82 of the hand-held scanning device 10 may be offset a distance of about 0.25 inches as illustrated by reference numeral 144 in FIG. 5. Some offset is necessary in order to achieve the sensor window overlap discussed above. In the example outlined above, the depth of housing portion 30 is the same as the depth of housing portion 60 and the sensor windows 52 and 82 are centered in their respective housing portions 30 and 60. When this is the case, the offset 144 will always be equal to the width of one of the housing portions 30 and 60.

To perform a scan, a user first slides the hand-held scanning device 10 into its open, use configuration as shown in FIGS. 3–5. This causes the contact pads of the connector assemblies 46 and 76 to align and the spring loaded ball 80 to engage in detent 50. The scanning device is then placed at one end of an object to be scanned as illustrated in FIG. 11.

Figure 11:
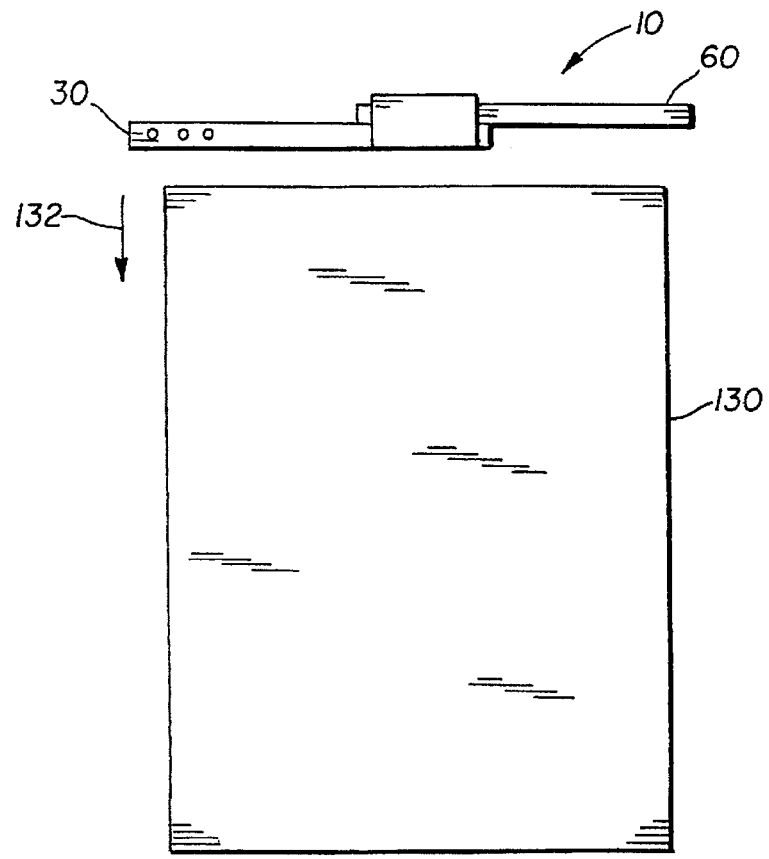
FIG. 11 is a schematic illustration showing the hand-held scanning device of FIGS. 1–5 being used to scan an object.

FIG. 11 shows the hand-held scanning device 10 positioned to begin a scan of a document 130. Document 130 may be, for example an 8½ inch by 11 inch page of text. To scan the document 130, the user depresses scan button 43 and holds it down while moving the scanning device across the object to be scanned in the scanning direction indicated by the arrow 132. As the scanner is moved, imaging assemblies 56 and 86 image line portions of the scanned object onto their respective photosensor arrays 58 and 88 which, in turn, send signals 98 and 100 indicative of the scanned line portions to microprocessor 110. Microprocessor 110 acquires a new line image each time a sampling interval occurs as is explained below in further detail.

The movement of the scanning device causes the rollers 44, 74 to roll along the surface of the object being scanned and, thus, causes the transducers 92, 90, attached to the rollers to generate signals indicative of the distance the scanning device has moved. Microprocessor 110 acquires new information from the photosensor arrays 58, 88 each time it detects that the scanning device has traveled a distance equal to one scan line. This distance is referred to as a sampling interval. In one example, where the photosensor arrays have a resolution of 200 dots per inch, one scan line has a width of about 0.005 inches. At a typical rate of movement of the scanning device during a scan, a sampling interval may last for approximately 250 microseconds.

The leading imaging assembly 56, located in housing portion 30, generates images of the generally left half of document 130 while the trailing imaging assembly 86, located in housing portion 60, generates images of the generally right half of document 130 as viewed in FIG. 11.

Microprocessor 110 combines these left half and right half images to obtain a complete width image of the document. Because the imaging assemblies 56 and 86 are offset in the scan direction 132, however, the microprocessor 110 must perform a "stitching" operation as will now be described.

Since the housing portion 30 will precede the housing portion 60 during a scan, the left-side line scan image data sent to microprocessor 110 by photosensor array 58 will represent a lower part of the document 130 than will the right-side data sent by photosensor array 88 at any given time during the scan. Accordingly, the microprocessor 110 must "stitch" together the image data from the two optical assemblies in order to obtain a complete image covering the width of the document.

The distance between sensor window 52 and sensor window 82 is fixed and known (In one example this distance may be 0.25 inches). The distance traveled by the scanning device 10 while performing a scan is also known from the signals 104 and 102 generated by the transducers 90 and 92 as previously described.

To perform the stitching operation, the microprocessor 110 temporarily stores each line scan image acquired from leading photosensor array 58 until the matching line scan image from trailing photosensor array 88 is acquired. This matching line scan image occurs when the hand-held scanning device 10 has traveled 0.25 inches from the point where the left side line scan image was acquired. It is noted that the distance 0.25 inches is used for purposes of example only. The proper distance will always be the actual physical distance between the optical windows 52 and 82.

The microprocessor 110 then combines the right and left hand images to obtain a complete width line scan. This process is repeated for each scan line obtained from the document 130.

Microprocessor 110 also detects "skew" in the scanning operation. Such skew occurs when one end of the hand-held scanning device is moved faster than the other end. Using information from the transducers 92 and 90 attached to rollers 44 and 74, the microprocessor 110 can detect and correct for such skew. If microprocessor 110 detects more movement by one of the rollers than the other roller, then a skew condition is indicated. For example, if transducer 92 indicates that a distance "X" has been travelled by the roller 44 and the transducer 90 indicates that a distance "Y" has been travelled by the roller 74, then the skew angle can be calculated as being equal to:

$$\arcsin[(X-Y)/((X-Y)^2+(8.7)^2)^{1/2}]$$

where the scanner has a scan length of 8.7 inches.

Once the skew angle is calculated, microprocessor 110 can appropriately adjust the acquired image to compensate for the skew. Alternatively, microprocessor 110 may signal the user, e.g., via a flashing light or an audible signal, that a skew condition exists, thus affording the user an opportunity to manually correct the skew by returning the scanning device 10 to a position in which it is parallel to the scanning direction 132, FIG. 11.

In an alternative embodiment of the invention, the stitching operation can be performed using information derived from the sensor window overlap area 142 instead of the rollers as previously described. To perform the stitching operation in this manner, the microprocessor 110 temporarily stores each line scan image acquired from leading photosensor array 58 until the matching line scan image from trailing photosensor array 88 is acquired. To determine when this matching line scan image is acquired by the trailing photosensor array 88, microprocessor 110 compares the overlap portion of the line image signal generated by the trailing optical assembly to the overlap portion of the line image signals temporarily stored from the leading photosensor array 58. Using a correlation process, microprocessor 110 compares the arriving lines from the trailing photosensor array 88 with the stored lines from the leading photosensor array 58 on a line by line basis and determines which stored line most closely matches each arriving line from the trailing photosensor array 88. Having found the matching lines from the two photosensor arrays 58, 88, microprocessor 110 performs a horizontal correlation of the two lines moving the relative position one pixel at a time until the highest correlation occurs in the overlap region. In this manner, microprocessor 110 combines the right and left hand images to obtain a complete width line scan. This process is repeated for each scan line obtained from the document 130.

Thus, according to this alternative embodiment, no physical movement data is required. Instead, the entire stitching operation is carried out using only optical information that is generated by the photosensor arrays 58 and 88.

The method described above may also be used to detect "skew" in the scanning operation. Using optical information as described above, the microprocessor 110 can detect and correct for such skew.

Figure 12:
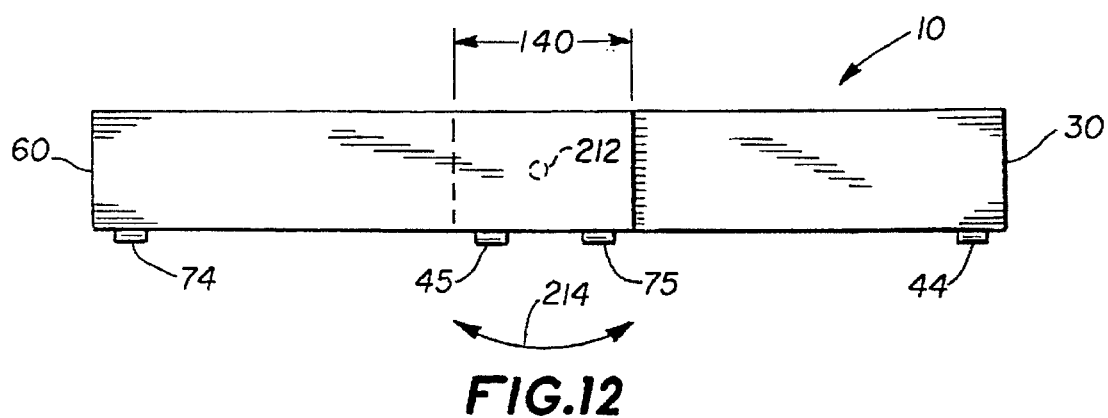
FIG. 12 is a rear elevation view of a hand-held scanning device which pivots between an expanded configuration and a closed configuration, shown in its expanded configuration.

FIGS. 12 through 15 illustrate an alternative embodiment of the invention in which the scanning device 10 pivots between its open, use configuration as shown in FIG. 12 and its closed configuration as shown in FIG. 13.

To accomplish this pivoting, a pivot mechanism 212 is provided between housing portion 30 and housing portion 60 as shown by hidden lines in FIG. 12. The pivot mechanism allows the housing portions 30 and 60 to pivot in the direction shown by arrow 214 in FIG. 12. In this manner, the housing portions 30 and 60 can be pivoted between the open configuration shown in FIG. 12 and the closed configuration shown in FIG. 13. Pivot mechanism 212 may be constructed in any conventional manner as is well-known and may also serve to hold the housing portions 30 and 60 together, as is well known.

Figure 14:
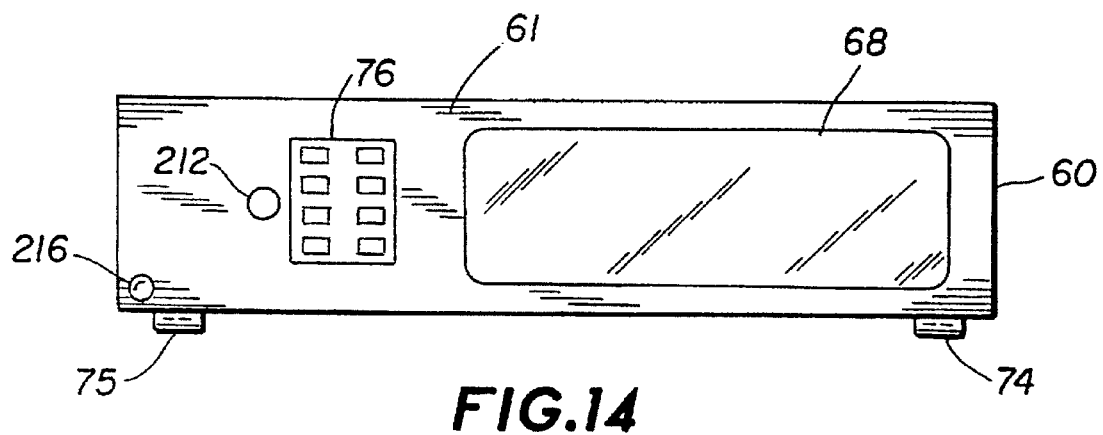
FIG. 14 is a front elevation view of a portion of the hand-held scanning device of FIG. 12.
Figure 15:
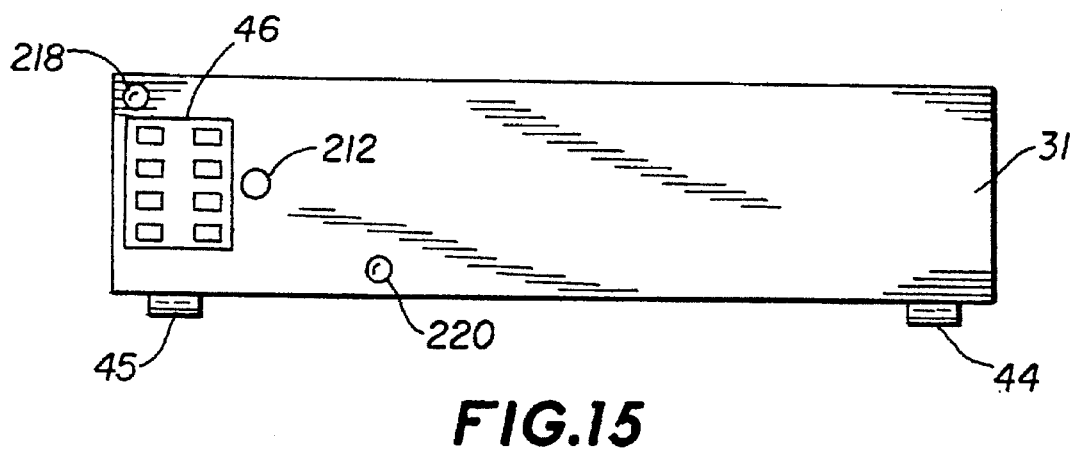
FIG. 15 is a front elevation view of another portion of the hand-held scanning device of FIG. 12.

To allow room for the pivot mechanism 212, the connector assemblies 74 and 76, previously described with respect to the embodiment of FIGS. 8 and 9, may be located as shown in FIGS. 14 and 15. Located in this manner, connector assembly 74 will align with connector assembly 76 when the hand-held scanning device is in its expanded configuration as shown in FIG. 12.

Spring loaded ball 216 may be located in the front surface 61 of housing portion 60 as shown in FIG. 14. When the hand-held scanning device 10 is in its open configuration as shown in FIG. 12, the spring loaded ball will engage a detent 220, FIG. 15, located in the front surface 31 of housing portion 30. Engagement by the spring loaded ball 216 in the detent 220 releasably holds the hand-held scanning device 10 in its open, use configuration in the same manner as previously described with respect to spring loaded ball 80 and detent 50.

In order to hold the hand-held scanning device 10 in its closed configuration as shown in FIG. 13, a second detent 218 is provided on the front surface 31 of housing portion 30, as shown in FIG. 15. The location of the spring loaded ball 216 and the detent 218 are such that the ball 216 engages in the detent 218 when the hand-held scanning device 10 is pivoted into its fully closed configuration, as shown in FIG. 13.

The pivoting hand-held scanning device 10 shown in FIGS. 12–15 may, otherwise, be constructed and operated in a similar manner to that described with respect to FIGS. 1–11.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A hand-held optical scanning device comprising:

a first housing portion containing at least one photosensor array and imaging means for imaging an object on said photosensor array;

a second housing portion containing at least one photosensor array and imaging means for imaging an object on said photosensor array;

a connector that allows relative movement between said first housing portion and said second housing portion to allow said scanning device to be expanded from a relatively smaller carrying configuration to a relatively larger scanning configuration.

2. The hand-held optical scanning device of claim 1 wherein said connector comprises a connector which slidingly attaches said first housing portion to said second housing portion.

3. The hand-held optical scanning device of claim 1 wherein said connector comprises a connector which pivotally attaches said first housing portion to said second housing portion.

4. An optical hand-held scanning device for scanning an object in a scanning direction comprising:

a housing having a length that is transverse to said scanning direction;

said housing length being adjustable between a relatively short non-use configuration and a relatively longer scanning configuration.

5. The hand-held scanning device of claim 4 wherein:

a) said housing comprises:

i) a first housing portion containing at least one photosensor array, said first housing portion having a length measured perpendicular to said scanning direction;

ii) a second housing portion connected to said first housing portion and containing at least one photosensor array, said second housing portion having a length measured perpendicular to said scanning direction;

b) said housing having a length measured perpendicular to said scanning direction, said housing being adjustable between:

i) a non-use configuration in which said length of said housing is substantially equal to said length of said first housing portion; and ii) a use configuration in which said length of said housing is greater than said length of said first housing portion.

6. A method of scanning an object with a hand-held optical scanning device comprising the steps of:

providing a hand-held optical scanning device that is adjustable between a relatively shorter carrying configuration and a relatively larger scanning configuration;

placing said hand-held optical scanning device in its larger scanning configuration;

performing a scan of an object;

placing said hand-held optical scanning device in its shorter carrying configuration.

7. A method as in claim 6 wherein said step of placing said hand-held optical scanning device in its shorter carrying configuration comprises sliding the hand-held optical scanning device into its shorter carrying configuration.

8. A method as in claim 6 wherein said step of placing said hand-held optical scanning device in its shorter carrying configuration comprises pivoting the hand-held optical scanning device into its shorter carrying configuration.

* * * * *